Oct. 19, 1971  W. A. MALBURG  3,613,207
METHOD FOR COVERING AND CLOSING COOLING
CHANNELS OF A COMBUSTION CHAMBER
Filed June 5, 1969

INVENTOR

Werner A. Malburg

By *McIlew and Toren*

ATTORNEYS

United States Patent Office 3,613,207
Patented Oct. 19, 1971

3,613,207
METHOD FOR COVERING AND CLOSING COOLING CHANNELS OF A COMBUSTION CHAMBER
Werner Adolf Malburg, Ottobrunn, Germany, assignor to Messerschmitt-Bolkow Gesellschaft mit beschrankter Haftung, Munich, Germany
Filed June 5, 1969, Ser. No. 830,743
Int. Cl. B21d *53/00;* B21k *29/00;* B23p *15/26*
U.S. Cl. 29—157 C   13 Claims

ABSTRACT OF THE DISCLOSURE

A method for covering and closing cooling channels which are defined in a combustion chamber wall includes inserting wire rods over the radially outer opened ends of the channels between longitudinally extending webs which define the channels and establishing a permanent connection of the wire rods to the webs such as by welding or soldering. A combustion engine particularly rocket engine is formed preferably with a cylindrical main combustion chamber portion having a narrow throat section terminating in a nozzle discharge for the thrust gases and with longitudinally extending grooves for cooling fluid which extend along the complete length of the combustion chamber and including the nozzle section. Spacers or templates are inserted into the bottom of the grooves from each end of the combustion chamber and they abut for example, in the narrow throat section. Thereafter wire rods are pressed into the grooves between the webs of the wall up to the limit of the templates and they are secured to the walls such as by electronic welding, by brazing using a soldering rod or by shield gas welding. Instead of using templates the rods may be formed with transverse supports or projecting shoulders or the webs may be formed with a step or shoulder to position the rod up to the desired groove penetration.

---

This invention relates, in general, to a method of constructing vessel walls, and in particular, to a new and useful method for forming cooling channels in combustion chambers particularly for rocket engines.

In the construction of rocket engine combustion chambers it is known to form a cooling channel in the wall of the combustion chamber by cutting longitudinal grooves into the combustion chamber wall blank. An insert of easily fusible material is then introduced between the resulting longitudinal webs and packed to a height corresponding to the height of the cooling channels to be formed between the webs. The covering of the cooling channels is effected by galvanizing or electroplating the outer wall of the combustion chamber. This process, however, is extremely time consuming and expensive, and moreover, after the galvanizing the originally applied material must be fused out. A disadvantage of the method is that it does not provide a safe connection between the electroplated material and the combustion chamber wall webs so that the individual cooling channels do not retain their sealed-tight condition.

In accordance with the present invention, there is proposed a simple, inexpensive and reliable method for closing the cooling channels which are formed between webs around the periphery of a combustion chamber wall. To accomplish this the channels are closed at their outer peripheries by the insertion of wire rods which are dimensioned to extend between the longitudinal webs defining the cooling channels therebetween. The rods are inserted to the proper depth to define the proper cooling channel height and then they are permanently connected to the webs for the combustion chamber wall such as by welding or soldering. The height of the cooling channels can be fixed in accordance with the method by forming the rods or the webs of the cooling wall such that the rods fit into the channels between the webs to a predetermined depth, or, spacer templates may be first inserted into the cooling channels. The spacer templates are of a height corresponding to the height of the cooling channel to be defined between two adjacent webs of the combustion chamber wall. Such a template may for example, comprise spring steel which is adapted to the curvature of the combustion chamber wall and to the discharge nozzle formation thereof. When the cooling channels to be formed are to be of variable cross section, for example, where they may narrow toward the combustion chamber neck portion or nozzle portion, two separate spacer templates are employed which may for example, be inserted into the cooling channel grooves from opposite ends of the combustion chamber wall. In such event the spacer templates are advantageously inserted to abut at the narrowest point of the nozzle neck.

It should be appreciated that the rods may be specially formed to provide the necessary configuration to permit them to extend into the cooling channels only to the desired height so that the proper height of cooling channel is left within the space between adjacent webs. In addition, the individual rods may be provided with cross supports which extend, for example, around the periphery of the combustion chamber wall and prevent insertion beyond a further point.

In order to weld or to solder the wire rods a welding or soldering device is guided longitudinally over the combustion chamber and it may advantageously include a roll which presses the wire rods onto the inserted spacer templates, for example, or onto the steps or shoulders provided for holding the rods at the desired height in each cooling channel. The rollers are moved in front of the welding or soldering device.

For a permanent connection of the wire rods with the longitudinal webs by adhesion and diffusion soldering in a furnace or by insertion of the soldered soils by vapor deposition of soldered layers between or in the areas to be interconnected by subsequent heating; the wire rods may be pressed by means of clamping bands which embrace the combustion chamber over the rods. These bands may be inserted by corresponding clamping tools or pliers, for example, even during the hardening of the weld or adhesive material or during the soldering operation.

Accordingly, it is an object of the present invention to provide a method of forming the cooling channels in a combustion chamber wall which includes inserting wire rods between the webs defining each cooling channel up to the desired depth and thereafter permanently securing the wire and ring rods to the webs such as by welding or soldering.

A further object of the invention is to provide a method of forming a combustion chamber wall with a plurality of longitudinally extending cooling channels which includes inserting wire rod members up to a predetermined depth for example, as determined by spacers inserted into the cooling channels or by the use of shoulders or ledge formations on the rods or the webs between the cooling channel grooves and thereafter holding the rods into the desired position as they are permanently connected to the webs such as by electronic welding, brazing or similar means; and thereafter, clamping the rods by applying circumferentially extending supports or clamping elements and permanently setting the weld and bonding the rods to the combustion chamber wall while in a furnace.

A further object of the invention is to provide a method of forming a combustion chamber particularly one having longitudinally extending cooling grooves in a wall thereof which may be carried out inexpensively and simply.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
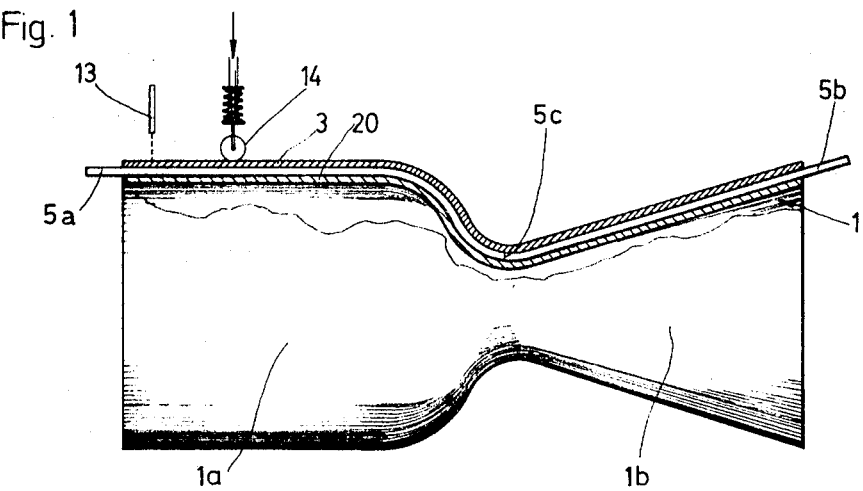
FIG. 1 is a side elevation partly in section, of a rocket engine constructed in accordance with the method of the invention.

Referring to the drawings in particular, the invention embodied therein comprises a method of forming a combustion chamber generally designated 1 particularly of a rocket engine of a type, for example, which includes a cylindrical combustion chamber 1a and a nozzle section 1b. On the outer face of the inner wall 20 of the combustion chamber there provided a plurality of longitudinally extending cooling channels 2 which are formed such as by machining or cutting grooves or channels between web portions 4.

Figure 4:
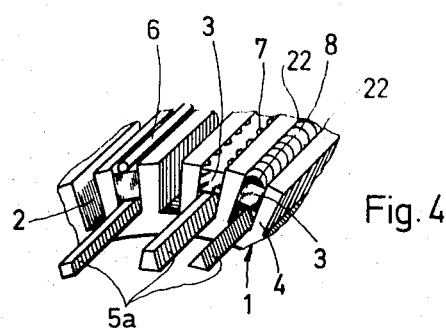
FIG. 4 is a perspective view of a portion of the combustion chamber wall indicating three separate means for positioning and securing the wire rods in position between the webs of the combustion chamber walls.

In accordance with the invention the cooling channels 2 are covered radially outwardly by the insertion of a wire rod 3 between the longitudinal webs 4. In accordance with one method in order to preserve a distinct preselected height of the cooling channel 2 flexible spacer templates 5a of a material such as spring steel are inserted into the bottom of each groove as indicated, for example, in FIGS. 1 and 4. These spacer templates 5a may be made of a material which is non-adherent to solder and may be formed in the various configurations indicated in FIG. 4, in order to achieve the desired positioning of the wire rods 3. For cooling channels 2 which have a narrowing cross section in the vicinity of the neck of the nozzle portion 1b it is preferable to provide at least two spacer templates which are inserted into the cooling channels 2 from each end of the combustion chamber and preferably abut for example, at 5c in the vicinity of the neck portion. As can be seen in FIG. 4, the spacer templates 5a and 5b may be narrower than the spacing between the longitudinal webs 4 or they may be of triangular or trapezoidal cross section which makes them especially flexible in radial directions. By selecting the proper configuration the danger of soldering or welding the spacers into the channels is reduced and they can be pulled out after the rods 3 are properly welded or soldered in position.

In accordance with one method, after the spacer templates 5a and 5b are fitted into the cooling channels 2 the wire rods 3 are inserted between the webs 4. They are firmly connected to the webs by gluing or brazing by means of melting down a solder bar 6 as indicated to the left hand portion of FIG. 4. Instead of soldering the rods 3 may be secured in position by electron beam welding 7 such as indicated in the central portion of FIG. 4. In accordance with a still further method they may be shield gas welded as indicated at 8 in FIG. 4. The brazing method has been shown to be particularly favorable.

It is desirable to leave capillary gaps 22 between the longitudinal sides of the webs 4 which will fill up with solder by capillary action. In such an arrangement, hard solder bonds with a large area of the wire rods 3 and the longitudinal webs 4 and thus forms a very strong covering of the cooling channel 2. After all of the cooling channels 2 have been closed by one or more of the above described methods, the spacer templates 5a and 5b are pulled out. Thereafter the surface of the combustion chamber is finish-machined for example, by turning.

Figure 2:
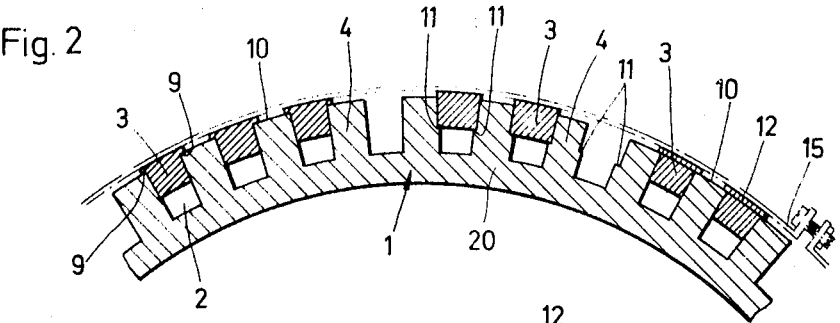
FIG. 2 is an enlarged radial sectional view of the combustion chamber indicated in FIG. 1 and showing three separate methods of positioning the rods in the cooling channels.
Figure 3:
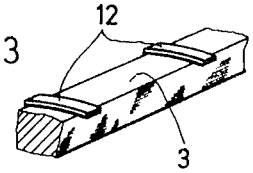
FIG. 3 is a perspective view of a rod construction for sealing the cooling channels.

In accordance with a further method of the invention the wire rods 3 may be positioned in the cooling channel to the desired depth by initially forming either the rods or the channels 2 in a manner to position the rods to the desired depth and to leave the desired channel height. As indicated in FIG. 2, this may be accomplished by forming the wire rods 3 with shoulders 9 so that they can be inserted only to the proper depth. A further way of accomplishing this is shown in the central portion of FIG. 3 wherein the webs 4 are formed with edges or steps 11 which accommodate the wire rods 3 but which prevent them from being inserted to a further depth. Lastly the rods 3 may be provided with transverse supports as indicated in FIG. 3 as shown in the right hand portion of FIG. 2. The outer ends of the support elements 12 rests on the surfaces 10 of the longitudinal webs 4.

In order to hold all of the wire rods 3 firmly against the spacer templates 5a and 5b or against the steps 11 or the shoulders 9 after they have been inserted in the cooling channels 2 it is possible to employ a roller device 14 which runs in front of the welding or soldering device or shown in FIG. 13 an electron beam welder 13. An alternate means may, for example, comprise a clamping arrangement including bands 15 which may be tightened around the circumference of the combustion chamber wall to hold the rods 3 in proper position, for example, for furnace soldering. In such event the rods are removed again after the soldering operation.

The invention provides a method which can be carried out quickly and cheaply both in respect to the operation steps and to the material required.

Another advantage of the invention resides in that by welding or soldering the wire rods to the longitudinal webs a high strength is attained with respect to the outer covering of each cooling channel 2. This is important especially because of the high pressures prevailing in the cooling channels. In addition the underside of the wire rods forms a continuously smooth hydrodynamically favorable surface which facilitates the flow of the cooling liquid through the channels 2.

What is claimed is:

1. An apparatus for facilitating the construction of a thrust engine combustion chamber cooling channels, comprising an annular combustion chamber wall having a plurality of longitudinally extending circumferentially spaced webs and cooling channels located between said webs, a wire rod of a length substantially the same as said channels and a width slightly smaller than each channel fitted into each of said cooling channels and covering the outer end of each of said cooling channels while leaving a free cooling channel flow area at the interior of each of said channels, and means in each of said cooling channels between said wire rod and said combustion chamber wall for preventing insertion of said rod beyond a predetermined depth and to leave a predetermined height of said cooling channel flow area remaining beneath said rod.

2. A method for forming the outer covering for a plurality of cooling channels defined in a combustion chamber wall between longitudinally extending webs of the wall, comprising inserting two spacer templates of a width narrower than the width of the cooling channels to be formed into the cooling channels, one from each end thereof, inserting a wire rod of at least the width of the spacing between the webs into the channel so as to cover it exteriorly and leave an inner free channel space at the interior in the area of said spacer templates, and permanently connecting the rods to the combustion chamber wall by forming a permanent adherence of the rods to the webs.

3. A method for forming the outer covering of a plurality of cooling channels defined in a combustion chamber wall between longitudinally extending webs of the wall, comprising determining the height of the cooling channel by inserting a flexible spacer template into the channel from respective opposite ends of the combustion chamber wall, and thereafter inserting a wire rod of at least the width of the spacing between the webs into the channels to an extent limited by the spacer templates to leave an inner free channel space at the interior at the location of the templates when the latter are removed and permanently connecting the rods to the combustion chamber by forming a permanent adherence of the rods to the webs.

4. A method for forming the outer covering for a plurality of cooling channels defined in a combustion chamber wall between longitudinally extending webs of the wall comprises inserting a wire rod of at least the width of the spacing between the webs into the channels so as to leave an inner free channel space at the interior, and permanently connecting the rods to the combustion chamber wall by forming a permanent adherence of the rods to the webs.

5. A method, according to claim 1, wherein the height of the cooling channels and the amount at which the rods has been inserted into the cooling channels is determined by initially inserting a flexible spacer template into the cooling channel and thereafter applying the rods over the channel to an extent limited by the spacer template.

6. A method, according to claim 3, wherein said rods are secured by welding and wherein said two spacer templates are inserted to abut against each other at the narrowest portion of the cooling channel.

7. A method, according to claim 1, wherein a flexible spacer template of a triangular or trapezoidal cross section is inserted into the cooling channel before the wire rods are applied.

8. A method, according to claim 1, wherein the wire rods are formed in respect to the webs such that they can be inserted up to an amount corresponding to the desired height of the cooling channel between the webs of the combustion chamber wall.

9. A method, according to claim 1, wherein the rods are bonded to the combustion chamber wall by means of a soldering or welding device which is moved along the combustion chamber wall and including moving a roller along each rod to hold it down against the combustion chamber wall prior to the advancing of the welding seam or soldering seam over the rod.

10. A method, according to claim 1, including clamping the rods against the combustion chamber wall and positioning the combustion chamber wall with the rods in a furnace for furnace soldering by diffusion or by local heating.

11. An apparatus, according to claim 1, wherein said means for permitting insertion of the rod into the cooling channel includes a shoulder formed on said rod which is adapted to abut against the outer surface of the webs defined on the combustion chamber wall.

12. An apparatus, according to claim 1, wherein said means for preventing insertion of said rods into said cooling channels beyond a predetermined depth include shoulders defined between said webs forming a receiving recess for said wire rods.

13. An apparatus, according to claim 1, wherein said means for preventing insertion of said rods into said cooling channels beyond the predetermined depth includes transversely extending support means adapted to contact the outer surface of said combustion chamber walls.

References Cited

UNITED STATES PATENTS

| | | | |
|---|---|---|---|
| 2,841,866 | 7/1958 | Schilling | 29—423 |
| 3,043,103 | 7/1962 | Dent | 29—157 C UX |
| 3,044,160 | 7/1962 | Jaffee | 29—423 |
| 3,131,535 | 5/1964 | Hensley | 29—157 C |
| 3,177,935 | 4/1965 | Rosman | 29—157.3 C |
| 3,201,858 | 8/1965 | Valyi | 29—423 |
| 3,235,947 | 2/1966 | Sohlemann | 29—157 C |
| 3,249,989 | 5/1966 | Robinson | 29—157 C |
| 3,254,395 | 6/1966 | Baehr | 29—157 C |
| 3,273,226 | 9/1966 | Brous | 29—423 |

JOHN F. CAMPBELL, Primary Examiner

D. P. ROONEY, Assistant Examiner

U.S. Cl. X.R.

29—423